Figure 1:
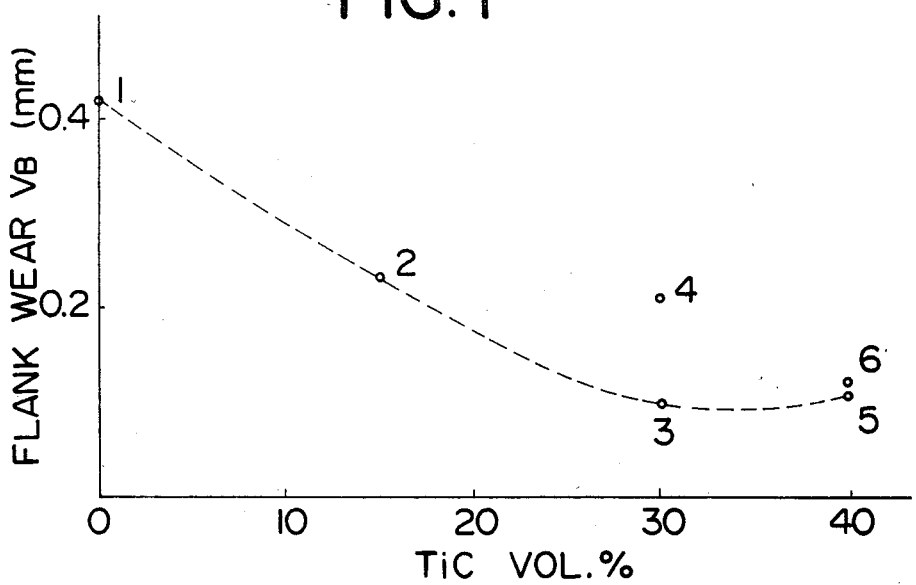

United States Patent [19]

Ishizuka et al.

[11] Patent Number: 4,596,693
[45] Date of Patent: Jun. 24, 1986

[54] METHOD OF PRODUCING A COMPOSITE COMPACT OF CBN AND WC-CO

[75] Inventors: Hiroshi Ishizuka, Tokyo; Shuhei Kuge, Nagano, both of Japan

[73] Assignee: The Ishizuka Research Institute Ltd., Japan

[21] Appl. No.: 776,629

[22] Filed: Sep. 16, 1985

[30] Foreign Application Priority Data

Sep. 28, 1984 [JP] Japan .............................. 59-204553

[51] Int. Cl.⁴ .............................................. B22F 3/00
[52] U.S. Cl. .......................................... 419/16; 419/23; 75/238; 75/244; 264/60; 264/332; 501/93; 501/96
[58] Field of Search ...................... 419/13, 15, 16, 23; 501/93, 96; 75/238, 244; 264/60, 332

[56] References Cited

U.S. PATENT DOCUMENTS 4,236,926 12/1980 Lindholm et al. ..................... 75/238
4,334,928 6/1982 Hara et al. ............................. 75/242
4,342,595 8/1982 Bourdeau ............................... 75/238
4,403,015 9/1983 Nakai et al. .......................... 419/413
4,442,180 4/1984 Hara et al. ............................. 75/242
4,505,746 3/1985 Nakai et al. ........................... 75/242

*Primary Examiner*—Stephen J. Lechert, Jr.
*Attorney, Agent, or Firm*—Larson and Taylor

[57] ABSTRACT

A method of producing a composite compact of cBN and WC-Co, comprising: mixing fine particles of cBN with a minor part of titanium carbide, the former being in an amount of 60–80% and the latter 40–20%, correspondingly, of the combined volume, putting the mixture in an intimate contact with a composite of WC-Co, heating the whole to a temperature high enough to cause an outflow of a liquid phase from said composite and infiltration thereof into said mixture under a pressure-temperature condition where cubic boron nitride is crystallographically stable, interjoining adjacent particles of cBN and titanium carbide, and as a whole to the composite of WC-Co, and recovering the integrated product of cBN, titanium carbide and WC-Co.

3 Claims, 2 Drawing Figures

METHOD OF PRODUCING A COMPOSITE COMPACT OF CBN AND WC-CO

The present invention relates to a method of producing a composite compact comprising cubic boron nitride (cBN) and, in particular, such compact in which the cBN particles are firmly joined in a thermally resistant structure scattered with particles of titanium carbide (TiC), so as to permit an excellant cutting performance especially in machining of rather soft steel materials.

cBN containing compacts are favored as tip material for turning steel. Conventionally, they are made, above all, to comprise 30–80% of cBN (on volume basis) and the balance of carbide, nitride, carbo-nitride and/or, and binder metal (as disclosed in Japanese Patent Kokai Sho 56-169,748), or 70% or more of cBN particles and the balance of aluminum alloy, bonded to a support of WC-Co, as described in U.S. Pat. No. 3,745,623. Such compacts exhibit a high hardness and, reportedly, may achieve a high performance in cutting hardened steel materials, particularly, of a hardness greater than 60 HRC. When applied to a fine machining or high-speed light cutting of less hardened steel materials of a hardness of about 45 HRC, however, the compacts tend to be readily damaged by the intense heat occuring in the process and are not that effective, and they are inferior to tools with a tip of cermet or cemented carbide in terms of resistance to chipping and fracture. Such inadequacy may be attributable to the thermally rather irresistible structure of the compact which, under the intense heat, may be substantially damaged either to release one or more hard particles of cBN which inturn can accelerate tip wear by coming in contact, as held in turnings, to abrade the tool tip; or which may be damaged at some part off the working edge.

There are no other cBN composites known which could exhibit, as well as a high cutting efficiency, a sufficiently high resistance to the chipping and fracture in comparison with cermet or carbide tips on cutting tools.

Therefore one of the principal objects of the invention is to provide a thermally resistant high-hardness composite of cBN with a WC-Co backing. According to the invention there is provided a method of producing such composite compact, comprising: mixing fine particles of cBN with a minor part of titanium carbide, the former being in an amount of 60-80% and the latter 40-20%, correspondingly, of the combined volume, putting the mixture in an intimate contact with a composite of WC-Co, heating the whole to a temperature high enough to cause an outflow of a liquid phase from said composite and infiltration thereof into said mixture under a pressure-temperature condition where cubic boron nitride is crystallographically stable, interjoining adjacent particles of cBN and titanium carbide, and as a whole to the composite of WC-Co, and recovering the integrated product of cBN titanium carbide and WC-Co.

In the invention the cBN particles of an average grain size of or smaller than 9 microns are employed optimally. Coarser grains are increasingly sensitive to transgranular cracking to result in an accelerated wear of the compact.

As mixed with particles of titanium carbide, the cBN particles are spreaded immediately on the surface of a composite of WC-Co which may be in the form of either sintered body, green compact or loose mass of mixed powder. The system WC-Co optimally has a metal content of 8–10% by weight.

In the sintering process of cBN which inherently is very difficult to join by itself, an amount of metallic phase may be necessary to interjoint such particles and the favorable range of the amount is very close; too much a metallic phase unfavorably results in a decreased strength of the bond of contained particles and, finally, substantial deterioration in hardness and other mechanical properties. In the process of the method of the invention, a liquid metal is allowed to form in the WC-Co and infiltrate in an adequate amount into the mixture of cBN and TiC, thus causing interjoint of the particles of two materials, and as a whole to the WC-Co substrate.

The thus produced composite compact has a structure in which are scattered homogeneously particles of titanium carbide which is excellent in thermal stability, tensile strength and bondability to cBN, so the compact of the invention as a whole exhibits a substantial improvement in hardness and thermal resistance, as well.

Now the invention will be described more specifically by means of an example, in which several compacts were prepared according to the invention and used as tip element in turning steel materials. The results are graphically illustrated in FIGS. 1 and 2 in comparison with conventional products.

EXAMPLE

Mixed powders of varying compositions were prepared listed below:

| Specimen No. | | 1 | 2 | 3 | 4 | 5 | 6 | 7 |
|---|---|---|---|---|---|---|---|---|
| cBN | Grain size (micron) | 9 | 9 | 9 | 15 | 9 | 9 | 9 |
| | Vol. % | 100 | 85 | 70 | 70 | 60 | 60 | 70 |
| TiC | Grain size (micron) | — | 15 | 15 | 15 | 15 | 5 | Tic + Ni |
| | Vol. % | — | 15 | 30 | 30 | 40 | 40 | 20 + 10 |
| Total weight (mg) | | 130 | 140 | 150 | 150 | 160 | 160 | 180 |

A tubular vessel, with a some 9 mm diameter, of tantalum foil was loaded with each of said powders and 3.2 grams of green compact of WC-8%Co, and closed at the top with a plate of tantalum. The entire assembly was mounted on a monoaxial high-pressure high-temperature apparatus and treated under a pressure of 5 GPa and a temperature of 1,300° C. for 5 minutes. Each product was machined into a cutting tip and, as clamped on a shank, tested in a turning of a round bar of steel over a period of 20 minutes under the conditions:

| Workpiece material: | Steel equivalent to ASTM A 686, hardness 45 HRC |
|---|---|
| Depth of cut: | 0.3 mm |
| Feed: | 0.2 mm/rev. |
| Cutting speed: | 150 m/min. |
| Mode: | Dry |

Figure 2:
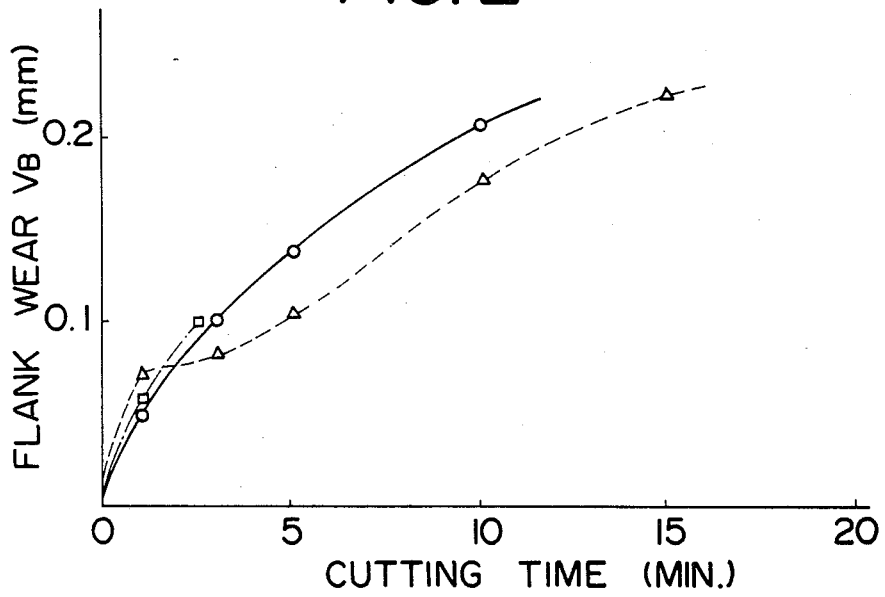

The results in terms of the flank wear $V_B$ (in mm) and service life, in which the $V_B$ has reached 0.02 mm, of the tip are shown in the table below and FIG. 1, respectively, in which the numerals attached to the mark " " correspond to the numbers of specimens.

| Specimen No. | 1 | 2 | 3 | 4 | 5 | 6 | 7 |
|---|---|---|---|---|---|---|---|
| Service life (min.) | 5 | 20 | >60 | 20 | 45 | 45 | 5 |

Comparison was made with two different types of cBN compacts as control from different manufactures, which anyhow were directed to similar applications as the invention contemplates. The results in turning a steel bar of 45 HRC were:

| Specimen No. | Control No. 1 | Control No. 2 |
|---|---|---|
| Service life (min.) | 40 | 20 |

Next, 150 mg of mixed powder was prepared of 70 Vol.% of cBN (of an average size of 9 microns) and 30 Vol.% of TiC (of an average size of 15 microns) and was sintered under those conditions to form a composite compact, which was further machined to form a tip. The product was compared in a test under similar conditions as above, but at a cutting speed of 100 m/min, in which a steel equivalent to ASTM A 681, of a hardness of 60HRC, was turned as well as both controls. The results are graphically shown in FIG. 2, in which the data are represented by " " for the tip of the invention and "Δ" and "□" for the control product Nos. 1 and 2, respectively. In this test of cutting a harder steel of 60 HRC, the product of the invention obviously is well comparable to the better control product (No. 1), while the other, No. 2, failed by fracture in an early stage of the test process.

As the above example apparently has demonstrated, the composite compact of the invention is capable of achieving a substantial improvement in cutting of rather soft steel materials with a hardness of and lower than 60 HRC.

We claim:

1. A method of producing a composite compact of cBN and WC-Co, comprising: mixing fine particles of cBN with a minor part of titanium carbide, the former being in an amount of 60–80% and the latter 40–20%, correspondingly, of the combined volume, putting the mixture in an intimate contact with a composite of WC-Co, heating the whole to a temperature high enough to cause an outflow of a liquid phase from said composite and infiltration thereof into said mixture under a pressure-temperature condition where cubic boron nitride is crystallographically stable, interjoining adjacent particles of cBN and titanium carbide, and as a whole to the composite of WC-Co, and recovering the integrated product of cBN, titanium carbide and WC-Co.

2. The method as recited in claim 1, in which said particles of cBN have an average grain size not in excess of 9 microns.

3. The method as recited in claim 1, in which said composite of WC-Co has a cobalt content ranging between 8 and 10% relative to the combined weight of WC and Co.

* * * * *